(12) United States Patent
Kitamorn et al.

(10) Patent No.: US 6,976,191 B2
(45) Date of Patent: Dec. 13, 2005

(54) METHOD AND APPARATUS FOR ANALYZING HARDWARE ERRORS IN A LOGICAL PARTITIONED DATA PROCESSING SYSTEM

(75) Inventors: Alongkorn Kitamorn, Austin, TX (US); Ashwini Kulkarni, Austin, TX (US); Gordon D. McIntosh, Austin, TX (US); Kanisha Patel, Cedar Park, TX (US); Michael Anthony Perez, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 680 days.

(21) Appl. No.: 10/093,433

(22) Filed: Mar. 7, 2002

(65) Prior Publication Data

US 2003/0172322 A1    Sep. 11, 2003

(51) Int. Cl.[7] ............................................. G06F 11/00
(52) U.S. Cl. .............................. 714/43; 714/44; 714/56
(58) Field of Search .............................. 714/43, 44, 56

(56) References Cited

U.S. PATENT DOCUMENTS

| | | | | |
|---|---|---|---|---|
| 4,144,589 A | * | 3/1979 | Baker et al. ................. 365/203 |
| 5,978,938 A | * | 11/1999 | Kaiser et al. ................. 714/48 |
| 6,012,137 A | * | 1/2000 | Bublil et al. ................. 712/36 |
| 6,012,148 A | * | 1/2000 | Laberge et al. ................ 714/2 |
| 6,223,299 B1 | * | 4/2001 | Bossen et al. ................. 714/5 |
| 6,253,250 B1 | | 6/2001 | Evans et al. ................. 709/253 |
| 6,260,159 B1 | | 7/2001 | Garnett et al. ................ 714/15 |
| 6,502,208 B1 | * | 12/2002 | McLaughlin et al. ......... 714/25 |
| 6,557,121 B1 | | 4/2003 | McLaughlin et al. ......... 714/44 |
| 6,594,785 B1 | * | 7/2003 | Gilbertson et al. ........... 714/48 |
| 6,643,727 B1 | | 11/2003 | Arndt et al. ................. 710/314 |
| 6,728,668 B1 | * | 4/2004 | Kitamorn et al. ............. 703/22 |
| 2003/0163768 A1 | * | 8/2003 | Dawkins et al. .............. 714/43 |

\* cited by examiner

*Primary Examiner*—Bryce P. Bonzo
*Assistant Examiner*—Michael Maskulinski
(74) *Attorney, Agent, or Firm*—Duke W. Yee; Mark E. McBurney; James O. Skarsten

(57) ABSTRACT

A method, apparatus, and computer instructions for processing errors in a hierarchical input/output sub-system having an input/output bridge with a plurality of hardware devices in a level below the bridge. A value is read from a selected register to form a read value in response to detecting an error. The selected register is reset. Each bit in the read value associated with the error is cleared to form a cleared value. The cleared value is written into the selected register such that errors occurring since the register was cleared are preserved. The error registers below the bridge are scanned in response to an absence of an error being detected in a bridge within the input/output sub-system. A determination is made as to whether the error has previously occurred in response to a presence of an error being found by scanning the registers below the bridge. The error is reported in response to an absence of a determination that the error has previously occurred.

34 Claims, 5 Drawing Sheets

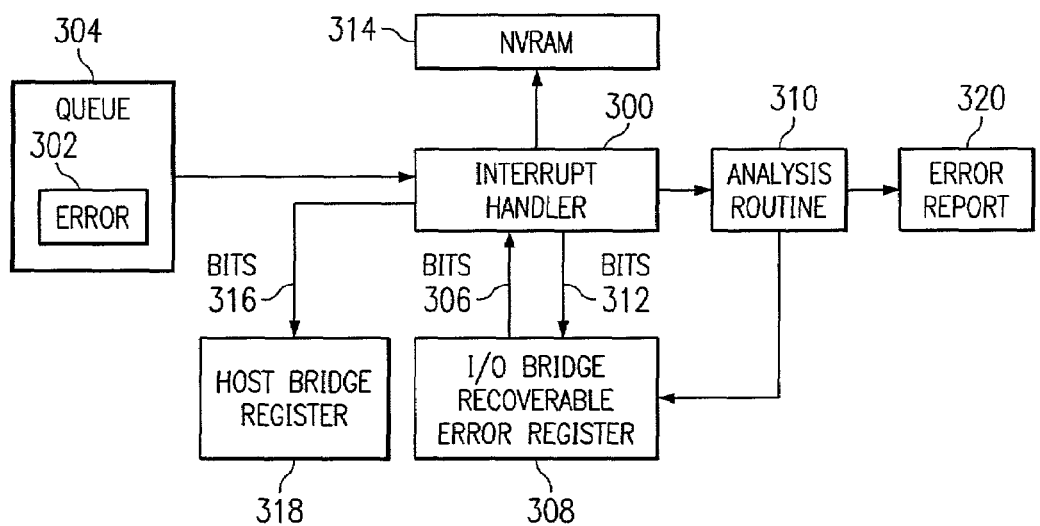
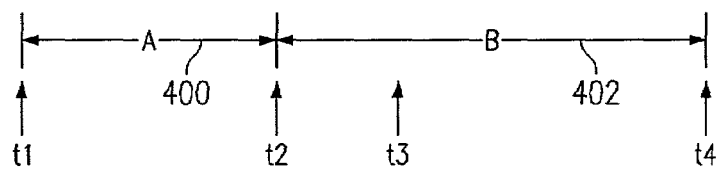

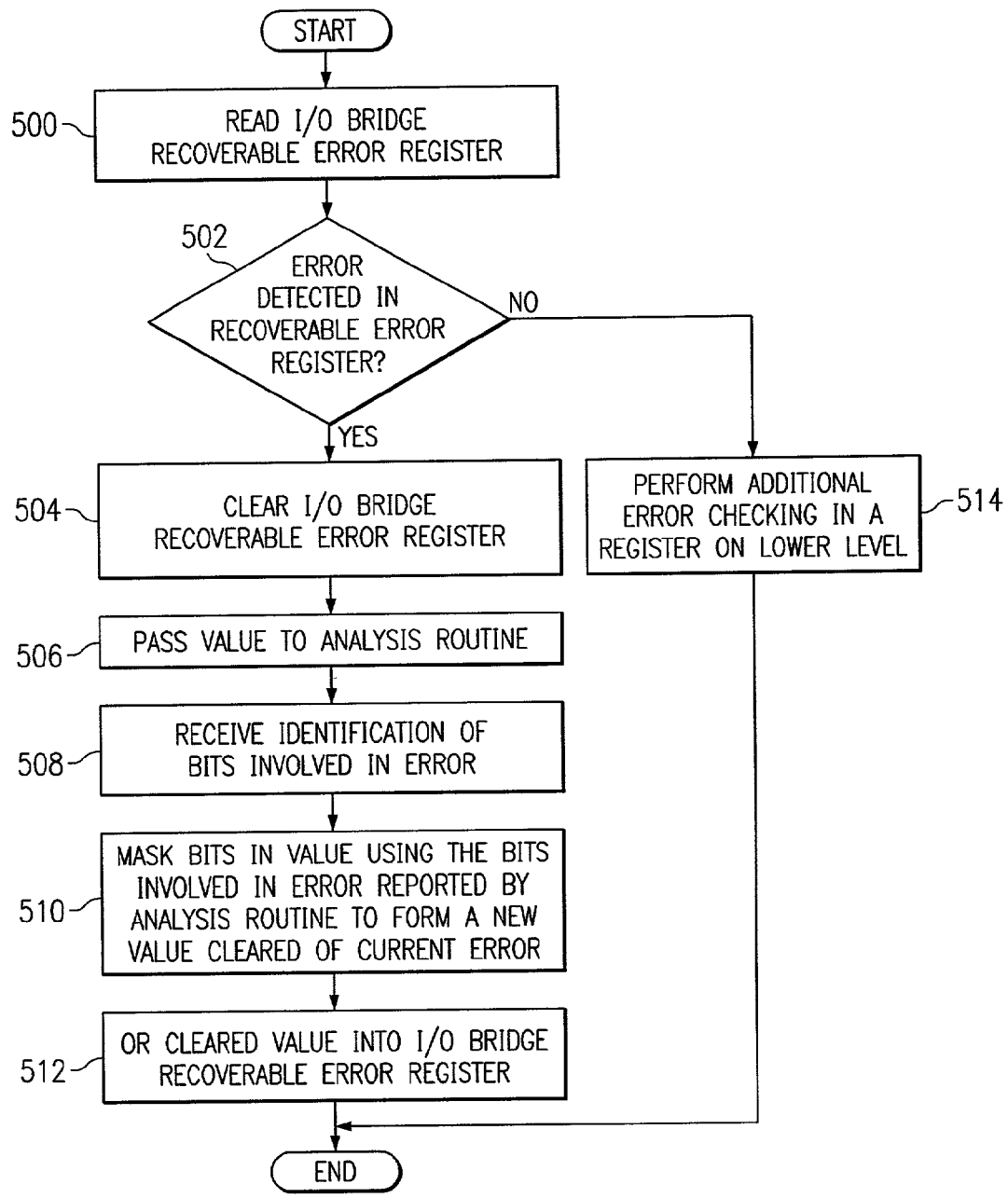

METHOD AND APPARATUS FOR ANALYZING HARDWARE ERRORS IN A LOGICAL PARTITIONED DATA PROCESSING SYSTEM

CROSS REFERENCE TO RELATED APPLICATION

The present invention is related to the following application entitled: "Method and Apparatus for Enhancing Input/Output Error Analysis in Hardware Sub-Systems", Ser. No. 10/093,433, filed even date hereof, assigned to the same assignee, and incorporated herein by reference.

BACKGROUND OF THE INVENTION

1. Technical Field

The present invention relates generally to an improved data processing system, and in particular, to a method and apparatus for processing errors. Still more particularly, the present invention provides a method and apparatus for processing input/output errors in a logical partitioned data processing system.

2. Description of Related Art

A logical partitioned (LPAR) functionality within a data processing system or platform allows multiple copies of a single operating system (OS) or multiple heterogeneous operating systems to be simultaneously run on a single data processing system platform. A partition, within which an operating system image runs, is assigned a non-overlapping subset of the platform's resources. These platform allocable resources include one or more architecturally distinct processors with their interrupt management area, regions of system memory, and input/output (I/O) adapter bus slots. The partition's resources are represented by the platform's firmware to the OS image.

Each distinct OS or image of an OS running within the platform is protected from each other such that software errors on one logical partition cannot affect the correct operation of any of the other partitions. This is provided by allocating a disjoint set of platform resources to be directly managed by each OS image and by providing mechanisms for ensuring that the various images cannot control any resources that have not been allocated to it. Furthermore, software errors in the control of an operating system's allocated resources are prevented from affecting the resources of any other image. Thus, each image of the OS (or each different OS) directly controls a distinct set of allocable resources within the platform.

With respect to hardware resources in a LPAR system, these resources are disjointly shared among various partitions, themselves disjoint, each one seeming to be a stand-alone computer. These resources may include, for example, input/output (I/O) adapters, memory dimms, non-volatile random access memory (NVRAM), and hard disk drives. Each partition within the LPAR system may be booted and shutdown over and over without having to power-cycle the whole system.

In reality, some of the I/O devices that are disjointly shared among the partitions are themselves controlled by a common piece of hardware, such as a host Peripheral Component Interface (PCI) bridge, which may have many I/O adapters controlled or below the bridge. The host bridge and the I/O adapters connected to the bridge form a hierarchical hardware sub-system within the LPAR system. Further, this bridge may be thought of as being shared by all of the partitions that are assigned to its slots. One or more of these host bridges are in turn connected to an I/O bridge, which is used by the processors to access the different I/O sub-systems.

Presently, when errors occur, timing windows are present during which operations such as identifying an error, clearing registers, and analyzing errors occur. The existence of these timing windows may allow secondary hardware I/O errors to be reported as a generic unrecoverable error and may allow primary I/O errors that fall within a critical timing window to go unreported. These undetected or misdiagnosed errors result in the I/O hardware causing the errors to go unmarked or unidentified. In a subsequent cycle, this hardware may be accessed again and may lead to a subsequent system crash.

Therefore, it would be advantageous to have an improved method, apparatus, and computer instructions for eliminating timing windows that allow undetected errors in an I/O sub-system.

SUMMARY OF THE INVENTION

The present invention provides a method, apparatus, and computer instructions for processing errors in a hierarchical input/output sub-system having an input/output bridge with a plurality of hardware devices in a level below the bridge. A value is read from a selected register to form a read value in response to detecting an error. The selected register is reset. Each bit in the read value associated with the error is cleared to form a cleared value. The cleared value is written into the selected register such that errors occurring since the register was cleared are preserved.

The error registers below the bridge are scanned in response to an absence of an error being detected in a bridge within the input/output sub-system. A determination is made as to whether the error has previously occurred in response to a presence of an error being found by scanning the registers below the bridge. The error is reported in response to an absence of a determination that the error has previously occurred.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a diagram illustrating components used in processing I/O errors in accordance with a preferred embodiment of the present invention;

FIG. 4 is a diagram illustrating timing windows in response to the detection of an error in accordance with a preferred embodiment of the present invention;

FIG. 5 is a flowchart of a process used for processing I/O errors in accordance with a preferred embodiment of the present invention.

DETAILED DESCRIPTION OF THE PREFERRED EMBODIMENT

Figure 1:
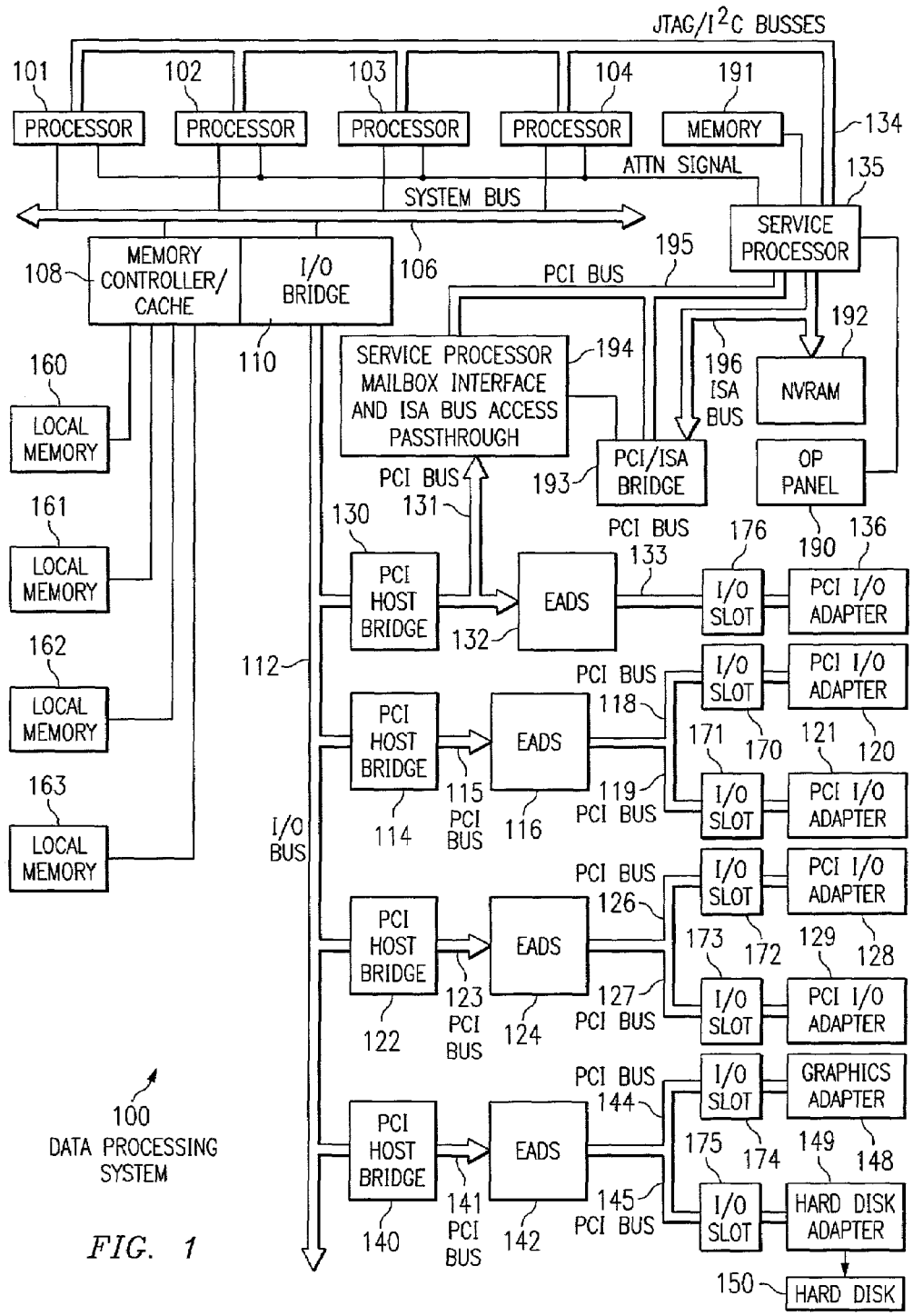
FIG. 1 is a block diagram of a data processing system in which the present invention may be implemented.

With reference now to the figures, and in particular with reference to FIG. 1, a block diagram of a data processing system in which the present invention may be implemented is depicted. Data processing system 100 may be a symmetric multiprocessor (SMP) system including a plurality of processors 101, 102, 103, and 104 connected to system bus 106. For example, data processing system 100 may be an IBM RS/6000, a product of International Business Machines Corporation in Armonk, N.Y., implemented as a server within a network. Alternatively, a single processor system may be employed. Also connected to system bus 106 is memory controller/cache 108, which provides an interface to a plurality of local memories 160–163. I/O bus bridge 110 is connected to system bus 106 and provides an interface to I/O bus 112. Memory controller/cache 108 and I/O bus bridge 110 may be integrated as depicted.

Data processing system 100 is a logically partitioned data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI I/O adapters 120–121, 128–129, and 136, graphics adapter 148, and hard disk adapter 149 may be assigned to different logical partitions. In this case, graphics adapter 148 provides a connection for a display device (not shown), while hard disk adapter 149 provides a connection to control hard disk 150.

Thus, for example, suppose data processing system 100 is divided into three logical partitions, P1, P2, and P3. Each of PCI I/O adapters 120–121, 128–129, 136, graphics adapter 148, hard disk adapter 149, each of host processors 101–104, and each of local memories 160–163 is assigned to one of the three partitions. For example, processor 101, local memory 160, and I/O adapters 120, 128, and 129 may be assigned to logical partition P1; processors 102–103, local memory 161, and PCI I/O adapters 121 and 136 may be assigned to partition P2; and processor 104, local memories 162–163, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX) operating system may be executing within partition P1, a second instance (image) of the AIX operating system may be executing within partition P2, and a Windows 2000 operating system may be operating within logical partition P1. Windows 2000 is a product and trademark of Microsoft Corporation of Redmond, Wash.

Peripheral component interconnect (PCI) host bridge 114 connected to I/O bus 112 provides an interface to PCI local bus 115. A number of PCI input/output adapters 120–121 may be connected to PCI bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations will support between four and eight I/O adapters (i.e. expansion slots for add-in connectors). Each PCI I/O Adapter 120–121 provides an interface between data processing system 100 and input/output devices such as, for example, other network computers, which are clients to data processing system 100.

An additional PCI host bridge 122 provides an interface for an additional PCI bus 123. PCI bus 123 is connected to a plurality of PCI I/O adapters 128–129. PCI I/O adapters 128–129 may be connected to PCI bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/O adapters 128 and 129 are placed into I/O slots 172 and 173, respectively. In this manner, additional I/O devices, such as, for example, modems or network adapters may be supported through each of PCI I/O adapters 128–129. In this manner, data processing system 100 allows connections to multiple network computers.

A memory mapped graphics adapter 148 inserted into I/O slot 174 may be connected to I/O bus 112 through PCI bus 144, PCI-to-PCI bridge 142, PCI bus 141 and host bridge 140. Hard disk adapter 149 may be placed into I/O slot 175, which is connected to PCI bus 145. In turn, this bus is connected to PCI-to-PCI bridge 142, which is connected to PCI Host Bridge 140 by PCI bus 141.

A PCI host bridge 130 provides an interface for a PCI bus 131 to connect to I/O bus 112. PCI I/O adapter 136 is connected to I/O slot 176, which is connected to PCI-to-PCI bridge 132 by PCI bus 133. PCI-to-PCI bridge 132 is connected to PCI bus 131. This PCI bus also connects PCI host bridge 130 to the service processor mailbox interface and ISA bus access pass-through logic 194 and PCI-to-PCI bridge 132. Service processor mailbox interface and ISA bus access pass-through logic 194 forwards PCI accesses destined to the PCI/ISA bridge 193. NVRAM storage 192 is connected to the ISA bus 196. Service processor 135 is coupled to service processor mailbox interface and ISA bus access pass-through logic 194 through its local PCI bus 195. Service processor 135 is also connected to processors 101–104 via a plurality of JTAG/I$^2$C busses 134. JTAG/I$^2$C busses 134 are a combination of JTAG/scan busses (see IEEE 1149.1) and Phillips I$^2$C busses. However, alternatively, JTAG/I$^2$C busses 134 may be replaced by only Phillips I$^2$C busses or only JTAG/scan busses. All SP-ATTN signals of the host processors 101, 102, 103, and 104 are connected together to an interrupt input signal of the service processor. The service processor 135 has its own local memory 191, and has access to the hardware OP-panel 190.

When data processing system 100 is initially powered up, service processor 135 uses the JTAG/I$^2$C busses 134 to interrogate the system (host) processors 101–104, memory controller/cache 108, and I/O bridge 110. At completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors 101–104, memory controller/cache 108, and I/O bridge 110. Any error information for failures detected during the BISTs, BATs, and memory tests are gathered and reported by service processor 135.

If a meaningful/valid configuration of system resources is still possible after taking out the elements found to be faulty during the BISTs, BATs, and memory tests, then data processing system 100 is allowed to proceed to load executable code into local (host) memories 160–163. Service processor 135 then releases the host processors 101–104 for execution of the code loaded into local memory 160–163. While the host processors 101–104 are executing code from respective operating systems within the data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 101–104, local memories 160–163, and I/O bridge 110. Service processor 135 is responsible for saving and reporting error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Program Loads (IPLs). IPLs are also sometimes referred to as a "boot" or "bootstrap".

Data processing system 100 may be implemented using various commercially available computer systems. For example, data processing system 100 may be implemented using IBM eServer iSeries Model 840 system available from International Business Machines Corporation. Such a system may support logical partitioning using an OS/400 operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

Figure 2:
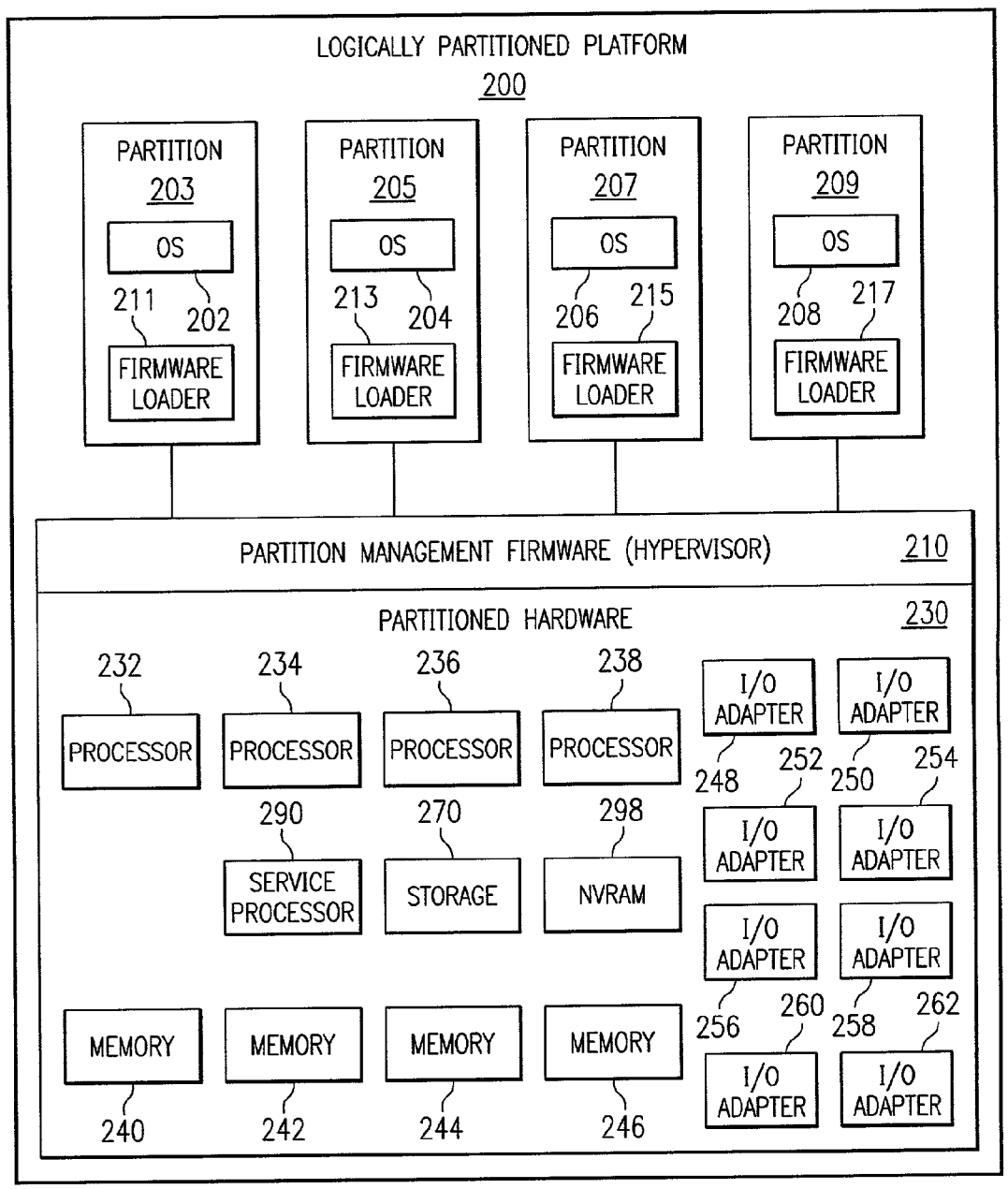
FIG. 2 is a block diagram of an exemplary logical partitioned platform in which the present invention may be implemented.

With reference now to FIG. 2, a block diagram of an exemplary logical partitioned platform is depicted in which the present invention may be implemented. The hardware in logically partitioned platform 200 may be implemented as, for example, data processing system 100 in FIG. 1. Logically partitioned platform 200 includes partitioned hardware 230, operating systems 202, 204, 206, 208, and hypervisor 210. Operating systems 202, 204, 206, and 208 may be multiple copies of a single operating system or multiple heterogeneous operating systems simultaneously run on platform 200. These operating systems may be implemented using OS/400, which are designed to interface with a hypervisor. Operating systems 202, 204, 206, and 208 are located in partitions 203, 205, 207, and 209. Additionally, these partitions also include firmware loaders 211, 213, 215, and 217. When partitions 203, 205, 207, and 209 are instantiated, a copy of the open firmware is loaded into each partition by the hypervisor's partition manager. The processors associated or assigned to the partitions are then dispatched to the partitions' memory to execute the partition firmware.

Partitioned hardware 230 includes a plurality of processors 232–238, a plurality of system memory units 240–246, a plurality of input/output (I/O) adapters 248–262, and a storage unit 270. Partition hardware 230 also includes service processor 290, which may be used to provide various services, such as processing of errors in the partitions. Each of the processors 232–238, memory units 240–246, NVRAM 298, and I/O adapters 248–262 may be assigned to one of multiple partitions within logically partitioned platform 200, each of which corresponds to one of operating systems 202, 204, 206, and 208.

Partition management firmware (hypervisor) 210 performs a number of functions and services for partitions 203, 205, 207, and 209 to create and enforce the partitioning of logically partitioned platform 200. Hypervisor 210 is a firmware implemented virtual machine identical to the underlying hardware. Hypervisor software is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and non-volatile random access memory (non-volatile RAM). Thus, hypervisor 210 allows the simultaneous execution of independent OS images 202, 204, 206, and 208 by virtualizing all the hardware resources of logically partitioned platform 200.

With reference now to FIG. 3, a diagram illustrating components used in processing I/O errors is depicted in accordance with a preferred embodiment of the present invention. In this example, interrupt handler 300 may be a machine check interrupt handler initiated by detecting an error, such as error 302 in queue 304. In this example, error 302 is a machine check interrupt. Queue 304 is a common queue for the processors and serializes access for all of the processors. The interrupt detected by the processor occurs in response to a machine check. A machine check is a condition indicating that an error has occurred by a hardware device malfunction. Queue 304 is a queue accessible by one or more processors to generate an indication that an error has occurred in an operation. Only one processor accesses the queue at any time, and only one processor is allowed in the interrupt handler at any time.

Interrupt handler 300 may be executed by a processor associated with the partition in which the error occurred, such as processor 101 or by another processor, such as service processor 135 in FIG. 1. When an error occurs, interrupt handler 300 may retrieve and examine data or bits 306 in a register, such as I/O bridge recoverable error register 308, which is located in an I/O bridge, such as I/O bridge 110 in FIG. 1. Bits 306 may be passed to analysis routine 310 to perform analysis to identify the source of the error. Interrupt handler 300 also may write bits 312 back into I/O bridge recoverable error register 308 or perform operations on the bits within this register. Interrupt handler 300 may store or write information into a memory, such as NVRAM 314, which may be implemented as NVRAM 192 in FIG. 1.

Further, in gathering data for analysis routine 310 to perform error analysis, interrupt handler 300 also may retrieve data such as bits 316 from host bridge register 318. This host bridge may be a host bridge, such as PCI host bridge 114 or PCI host bridge 122 in FIG. 1. In addition, interrupt handler 300 may send commands to host bridge register 318 to allow I/O operations to resume through devices connected to this bridge.

Analysis routine 310 takes the data received from interrupt handler 300 to perform an error analysis in an attempt to identify the source and type of error that has occurred. Analysis routine 310 also will clear I/O bridge recoverable error register 308 after the error has been isolated. The results of the analysis are placed in error report 320, which may be used to decide what further actions to take. These actions may include terminating one or more partitions in the LPAR system or unfreezing or re-enabling a host bridge to allow use of I/O devices connected to the host bridge. This error report also may be stored in NVRAM 314.

In the event reporting routine, the detection of an error in the I/O sub-system is signaled by the recoverable error register in the I/O bridge. If this register does not indicate an error, an assumption is made that the error has occurred in the memory sub-system. This register must be cleared to allow other errors to be reported. The time between the initial reading of the error and the clearing of the register is a time that allows other errors to occur that will not be reported correctly. If another error has occurred, the processor associated with the second error is held in the machine check input queue waiting for the first processor to complete processing of the first error. After the second processor enters the analysis code, this second processor finds no error indicated in the recoverable error register (RER). This result is a valid condition, therefore the software indicates an error in other than the I/O sub-system.

Turning next to FIG. 4, a diagram illustrating timing windows in response to the detection of an error is depicted in accordance with a preferred embodiment of the present invention. In this example, window A 400 is the time taken for an interrupt handler, such as interrupt handler 300 in FIG. 3, to determine if an error is a target I/O unrecoverable error. Window B 402 is the time needed for an analysis routine, such as analysis routine 310 in FIG. 3, to isolate the error. An initial machine check occurs at time t1 to indicate that an error has occurred. This initial machine check may be represented as error 302 in FIG. 3.

At time t2, the recoverable error register in the I/O bridge is read and passed to the analysis routine. This recoverable error register may be I/O bridge recoverable error register 308 in FIG. 3. At time t3, the recoverable error register is cleared by the analysis routine. Then, the interrupt handler will write into a memory, such as NVRAM 192 in FIG. 1, at time t4. The reading and immediate clearing of the register reduces the amount of time in which additional errors may occur between time t2 and time t3. Previously, the registers were not cleared, which allowed for errors when values for bits in the register were reset after analysis by an error analysis program. The analysis program would reset bits identified and analyzed as part of the error. The time span between the reading of the value of time t2 to the clearing of the bits, such as at time t4, allowed for other errors of the same kind to be lost. Through the reading and immediate clearing of the values in the registers, this window of time is reduced or essentially eliminated.

A value read from the recoverable error register and passed to the analysis routine for analysis. The registers in the I/O bridge are then cleared. The analysis routine will identify one or more bits in the value associated with a single error in these examples. The bits from the value passed to the analysis routine identified as being associated with the error are masked to clear the bits in the value read from the registers. This operation clears the bits associated with the error and the value passed to the analysis report from the interrupt handler. This value also may be referred to as a cleared value and is ORed back into the recoverable error register. Alternatively, the bits associated with the error may be masked off or cleared to be ORed back into the register. This operation preserves any errors occurring after the interrupt handler originally read the recoverable error register, rather than writing the values back which would clear other bits not set in the recoverable error register.

The present invention also provides a mechanism to minimize any errors that may occur during the time period after the value has been read from the registers at time t2 and the time period at which the registers are cleared at time t3. If an error occurs during this window of time, the error is typically lost or unrecognized.

This mechanism includes employing additional checks to scan error registers located below the I/O bridge, such as I/O bridge 110 in FIG. 1. These registers may be registers, such as those located in a host bridge, such as PCI host bridge 114 in FIG. 1. This check is made if an error is not indicated by registers in the I/O bridge in response to a detection of an error, such as a machine check interrupt. If no errors are present in the layer or level below the I/O bridge, then the error is a memory error rather than an I/O error. The mechanism of the present invention further identifies whether the error is one that has occurred previously. If the error has not previously occurred, then the error is a primary error and is reported for handling and analysis. If the error has previously occurred, the error is a secondary error and is not reported for handling and analysis.

Turning now to FIG. 5, a flowchart of a process used for processing I/O errors is depicted in accordance with a preferred embodiment of the present invention. The process illustrated in FIG. 5 may be implemented in an interrupt handler, such as interrupt handler 300 in FIG. 3.

The process begins by reading a value from the I/O bridge recoverable error register (step 500). A determination is made as to whether an error has been detected in the recoverable error register (step 502). If an error has been detected, the I/O bridge recoverable error register is cleared (step 504). The value is then passed to an analysis routine (step 506). An identification of the bits involved in the error is received (step 508). This identification may be returned by the analysis routine to the interrupt handler through placement of the identification in a memory, such as NVRAM 314 in FIG. 3.

The bits involved in the error reported by the analysis routine are cleared to form a new value that is cleared of the current error processed by the analysis routine (step 510). The clearing of the bits in the value may be performed by masking those bits and clearing them through an appropriate operation to clear the masked bits in the value. The value used is the one read from the recoverable error register. Thus, step 510 is used to clear the bits identified as being associated with the error by the analysis routine to form a cleared value. This cleared value is ORed into bits currently in the I/O bridge recoverable error register (step 512) and the process terminates thereafter. This step preserves errors occurring after the interrupt handler read the recoverable error register the first time.

With reference again to step 502, if an error is not detected in the recoverable error register, additional error checking is performed using registers on a lower level (step 514) and the process terminates thereafter. This checking of registers may involve devices, such as a host bridge on a lower level with respect to the I/O bridge. The description of this checking is explained in more detail in the explanation of FIG. 6 below.

Figure 6:
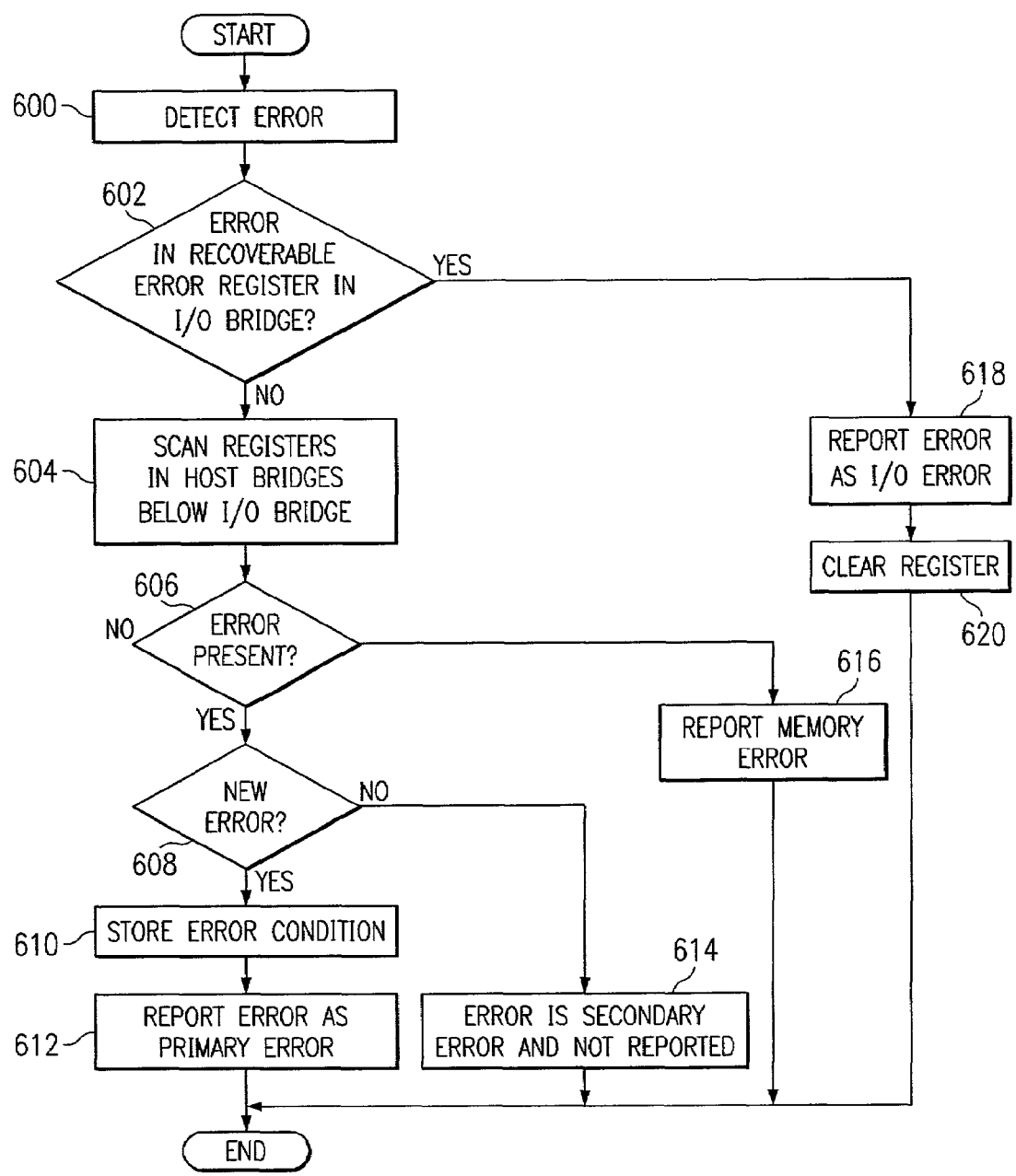
FIG. 6 is a flowchart of a process used for detecting errors in accordance with a preferred embodiment of the present invention.

With reference now to FIG. 6, a flowchart of a process used for detecting errors is depicted in accordance with a preferred embodiment of the present invention. The process illustrated in FIG. 6 may be implemented in an interrupt handler, such as interrupt handler 300 in FIG. 3.

The process begins by detecting an error (step 600). This error is detected in an I/O bridge, such as I/O bridge 110 in FIG. 1. A determination is made as to whether the recoverable error register in the I/O bridge indicates an error (step 602). If an error is not indicated, the registers in the host bridges below the I/O bridge are scanned (step 604). In these examples, the host bridges are the registers examined below the I/O bridges. The mechanism of the present invention may be used to examine any registers that may contain errors in devices located in a level or layer below the I/O bridge.

Next, a determination is made as to whether an error is present (step 606). If an error is present, a determination is made as to whether the error is a new error (step 608). This determination is made by comparing conditions set for this error with conditions stored from previous errors. If the error is a new error, the error condition is stored (step 610). The error is reported as a primary error (step 612) and the process terminates thereafter.

Returning again to step 608, if the error is not a new error, the error is identified as a secondary error, and is not reported (step 614) and the process terminates thereafter. With reference again to step 606, if an error is not present, a memory error is reported (step 616) and the process terminates thereafter.

Referring again to step 602, if an error is present in the recoverable error register in the bridge, the error is reported as an I/O error (step 618). The register is cleared (step 620) and the process terminates thereafter.

Thus, the present invention provides an improved method, apparatus, and computer instructions for handling I/O errors. The mechanism of the present invention reduces or eliminates windows in which errors may be lost or misidentified. One aspect of the present invention includes scanning registers below those of the I/O bridge to reduce a chance of errors being missed between the time of the initial reading of the error and the clearing of the register. In another aspect of the present invention, bits in a value read from a register are selectively cleared depending on which ones are associated with the error reported. This value is ORed back into the register to preserve other bits set, which were not associated with the error, as well as any errors that may have occurred after the register was read.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for processing errors in a hierarchical input/output sub-system having a bridge with a plurality of hardware devices in a level below the bridge, the method comprising:
    checking a register in the bridge in response to an error indication;
    responsive to detecting an absence of an error in the register in the bridge, scanning error registers in devices in a level below the bridge;
    responsive to a presence of an error being found by scanning the registers below the bridge, identifying the error as an input/output error; and
    responsive to an absence of an error being found by scanning the registers below the bridge, identifying the error as a memory error.

2. The method of claim 1 further comprising:
    responsive to a presence of an error being found by scanning the registers below the bridge in which the error has conditions identical to a last primary error, indicating that the error may be a secondary error; and
    responsive to an absence of an error being found by scanning the registers below the bridge in which the error has conditions identical to the last primary error, indicating that the error is a primary error.

3. The method of claim 2 further comprising:
    responsive to a presence of an error being found by scanning the registers below the bridge in which the error has conditions different from the last primary error, storing the conditions.

4. The method of claim 2 further comprising:
    responsive to a presence of an error being found by scanning the registers below the bridge, comparing the conditions in the error found by scanning the registers below with conditions for the last primary error.

5. The method of claim 1, wherein the bridge is an input/output bridge.

6. A method in a data processing system for processing errors in an input/output sub-system, the method comprising:
    responsive to detecting an error, reading a value from a selected register to form a read value;
    resetting the selected register;
    clearing each bit in the read value associated with the error to form a cleared value;
    writing the cleared value into the selected register such that errors occurring since the register was cleared are preserved;
    responsive to an absence of an error being detected in a bridge within the input/output sub-system, scanning error registers in a level below the bridge within the input/output sub-system;
    responsive to a presence of an error being found by scanning the error registers in a level below the bridge, determining whether the error has previously occurred; and
    responsive to an absence of a determination that the error has previously occurred, reporting the error.

7. The method of claim 6 further comprising:
    identifying the each bit within the read value associated using an error analysis routine.

8. The method of claim 6, wherein the selected register is a recoverable error register.

9. The method of claim 6, wherein the clearing step is performed by generating a mask using each bit in the read value associated with the error and clearing each bit in the read value associated with the error using the mask.

10. The method of claim 6, wherein the writing step is performed by using an OR function with bits in the cleared value and bits in the register as inputs to the OR function.

11. The method of claim 6, wherein the error is a recoverable error.

12. The method of claim 6, wherein the selected register is located in an input/output bridge.

13. The method of claim 6 further comprising:
responsive to an absence of a determination that the error has previously occurred, storing information about the error.

14. The method of claim 6 further comprising:
responsive to a determination that the error has previously occurred, identifying the error as a secondary error.

15. A method in a data processing system for processing errors in an input/output sub-system, the method comprising:
responsive to detecting an error, reading a value from a selected register;
resetting the selected register;
sending the value to an error analysis routine in which the error analysis routine identifies each bit associated with the error;
clearing each bit identified by the error analysis routine as being associated with the error to form a cleared value;
writing the cleared value into the selected register using an OR operation such that errors occurring since the register was cleared are preserved;
responsive to an absence of an error being detected in a bridge within the input/output sub-system, scanning error registers in a level below the bridge within the input/output sub-system;
responsive to a presence of an error being found by scanning the error registers in a level below the bridge, determining whether the error has previously occurred; and
responsive to an absence of a determination that the error has previously occurred, reporting the error.

16. The method of claim 15, wherein the selected register is located in an input/output bridge.

17. A data processing system for processing errors in a hierarchical input/output sub-system having an input/output bridge with a plurality of hardware devices in a level below the bridge, the data processing system comprising:
a bus system;
a communications unit connected to the bus system;
a memory connected to the bus system, wherein the memory includes a set of instructions; and
a processing unit connected to the bus system, wherein the processing unit executes the set of instructions to check a register in the bridge in response to an error indication; scan error registers in devices in a level below the bridge in response to detecting an absence of the error in a register in the bridge; identify the error as an input/output error in response to a presence of an error being found by scanning the registers below the bridge; and identify the error as a memory error in response to an absence of an error being found by scanning the registers below the bridge.

18. A data processing system for processing errors in an input/output sub-system, the data processing system comprising:
a bus system;
a communications unit connected to the bus system;
a memory connected to the bus system, wherein the memory includes a set of instructions; and
a processing unit connected to the bus system, wherein the processing unit executes the set of instructions to read a value from a selected register in response to detecting an error; reset the selected register; send the value to an error analysis routine in which the error analysis routine identifies each bit associated with the error; clear each bit identified by the error analysis routine as being associated with the error to form a cleared value; write the cleared value into the selected register using an OR operation such that errors occurring since the register was cleared are preserved; responsive to an absence of an error being detected in a bridge within the input/output sub-system, scan error registers in a level below the bridge within the input/output sub-system; responsive to a presence of an error being found by scanning the error registers in a level below the bridge, determine whether the error has previously occurred; and responsive to an absence of a determination that the error has previously occurred, report the error.

19. A data processing system for processing errors in a hierarchical input/output sub-system having an input/output bridge with a plurality of hardware devices in a level below the bridge, the data processing system comprising:
checking means for checking a register in the bridge in response to an error indication;
scanning means, responsive to detecting an absence of an error in the register in the bridge, for scanning error registers in devices in a level below the bridge;
first identifying means, responsive to a presence of an error being found by scanning the registers below the bridge, for identifying the error as an input/output error; and
second identifying means, responsive to an absence of an error being found by scanning the registers below the bridge, for identifying the error as a memory error.

20. The data processing system of claim 19 further comprising:
first indicating means, responsive to a presence of an error being found by scanning the registers below the bridge in which the error has conditions identical to a last primary error, for indicating that the error may be a secondary error; and
second indicating means, responsive to an absence of an error being found by scanning the registers below the bridge in which the error has conditions identical to the last primary error, for indicating that the error is a primary error.

21. The data processing system of claim 19, wherein the bridge is an input/output bridge.

22. The data processing system of claim 19 further comprising:
storing means, responsive to a presence of an error being found by scanning the registers below the bridge in which the error has conditions different from the last primary error, for storing the conditions.

23. The data processing system of claim 19 further comprising:
comparing means, responsive to a presence of an error being found by scanning the registers below the bridge, for comparing the conditions in the error found by scanning the registers below with conditions for the last primary error.

24. A data processing system for processing errors in an input/output sub-system, the data processing system comprising:
reading means, responsive to detecting an error, for reading a value from a selected register to form a read value;
resetting means for resetting the selected register;
clearing means for clearing each bit in the read value associated with the error to form a cleared value;
writing means for writing the cleared value into the selected register such that errors occurring since the register was cleared are preserved;

scanning means, responsive to an absence of an error being detected in a bridge within the input/output sub-system, for scanning error registers in a level below the bridge within the input/output sub-system;

determining means, responsive to a presence of an error being found by scanning the error registers in a level below the bridge, for determining whether the error has previously occurred; and reporting means, responsive to an absence of a determination that the error has previously occurred, for reporting the error.

25. The data processing system of claim 24 further comprising:

identifying means for identifying the each bit within the read value associated using an error analysis routine.

26. The data processing system of claim 24, wherein the selected register is a recoverable error register.

27. The data processing system of claim 24, wherein the clearing means generates a mask using each bit in the read value associated with the error and clears each bit in the read value associated with the error using the mask.

28. The data processing system of claim 24, wherein the writing means are performed by using an OR function with bits in the cleared value and bits in the register as inputs to the OR function.

29. The data processing system of claim 24, wherein the error is a recoverable error.

30. The data processing system of claim 24, wherein the selected register is located in an input/output bridge.

31. A data processing system for processing errors in an input/output sub-system, the data processing system comprising:

reading means, responsive to detecting an error, for reading a value from a selected register;

resetting means for resetting the selected register;

sending means for sending the value to an error analysis routine in which the error analysis routine identifies each bit associated with the error;

clearing means for clearing each bit identified by the error analysis routine as being associated with the error to form a cleared value;

writing means for writing the cleared value into the selected register using an OR operation such that errors occurring since the register was cleared are preserved;

scanning means, responsive to an absence of an error being detected in a bridge within the input/output sub-system, for scanning error registers in a level below the bridge within the input/output sub-system;

determining means, responsive to a presence of an error being found by scanning the error registers in a level below the bridge, for determining whether the error has previously occurred; and reporting means, responsive to an absence of a determination that the error has previously occurred, for reporting the error.

32. The data processing system of claim 31, wherein the selected register is located in an input/output bridge.

33. A computer program product in a computer readable recordable-type medium for processing errors in a hierarchical input/output sub-system having an input/output bridge with a plurality of hardware devices in a level below the bridge, the computer program product comprising:

first instructions for checking a register in the bridge in response to an error indication;

second instructions, responsive to detecting an absence of an error in the register in the bridge, for scanning error registers in devices in a level below the bridge;

third instructions, responsive to a presence of an error being found by scanning the registers below the bridge, for identifying the error as an input/output error; and fourth instructions, responsive to an absence of an error being found by scanning the registers below the bridge, for identifying the error as a memory error.

34. A computer program product in a computer readable recordable-type medium for processing errors in an input/output sub-system, the computer program product comprising:

first instructions, responsive to detecting an error, for reading a value from a selected register to form a read value;

second instructions for resetting the selected register;

third instructions for clearing each bit in the read value associated with the error to form a cleared value;

fourth instructions for writing the cleared value into the selected register such that errors occurring since the registered was cleared are preserved;

fifth instructions, responsive to an absence of an error being detected in a bridge within the input/output sub-system, for scanning error registers in a level below the bridge within the input/output sub-system;

sixth instructions, responsive to an error being found by scanning the error registers in a level below the bridge, for determining whether the error has previously occurred; and seventh instructions, responsive to an absence of a determination that the error has previously occurred, for reporting the error.

* * * * *